US010017260B2

(12) United States Patent
Moscatelli et al.

(10) Patent No.: US 10,017,260 B2
(45) Date of Patent: Jul. 10, 2018

(54) NACELLES FOR AIRCRAFT ENGINES WITH DE-ICING SYSTEMS USING A TWO-PHASE FLUID

(71) Applicant: FINMECCANICA—Società per azioni, Rome (IT)

(72) Inventors: Antonio Moscatelli, Turin (IT); Gianni Mancuso, Turin (IT)

(73) Assignee: FINMECCANICA—SOCIETA' PER AZIONI, Rome (IT)

( * ) Notice: Subject to any disclaimer, the term of this patent is extended or adjusted under 35 U.S.C. 154(b) by 242 days.

(21) Appl. No.: 15/162,640

(22) Filed: May 24, 2016

(65) Prior Publication Data
US 2016/0347459 A1 Dec. 1, 2016

(30) Foreign Application Priority Data

May 28, 2015 (IT) .............................. 1020150018736

(51) Int. Cl.
*B64D 15/06* (2006.01)
*B64D 15/08* (2006.01)
(Continued)

(52) U.S. Cl.
CPC ............ *B64D 15/08* (2013.01); *B64D 15/06* (2013.01); *B64D 29/00* (2013.01); *B64D 33/02* (2013.01);
(Continued)

(58) Field of Classification Search
CPC ........ B64D 15/02; B64D 15/06; B64D 15/08; B64D 2033/0233; B64D 2033/024
See application file for complete search history.

(56) References Cited

U.S. PATENT DOCUMENTS 2,470,128 A * 5/1949 Barrick .................. B64D 15/02
244/123.12
2,876,970 A * 3/1959 Halbert .................. B64D 15/16
244/134 R
(Continued)

FOREIGN PATENT DOCUMENTS

FR 2987602 A1 9/2013
WO 2005073539 A1 8/2005

OTHER PUBLICATIONS

Italian Search Report I0 56218 IT UB 20151085—dated Jan. 13, 2016.

*Primary Examiner* — Richard R Green
(74) *Attorney, Agent, or Firm* — Robert E. Alderson, Jr.

(57) ABSTRACT

Nacelles are provided having a tubular casing, open at its opposite axial ends, with an inner wall and an outer wall which are connected to each other at the front end along a leading edge and at the rear end along a trailing edge and which enclose, together with the leading edge and the trailing edge, a cavity. To prevent the formation of ice at least in the zone of the leading edge of the nacelle, a separating member made of porous material is arranged inside the cavity to divide the cavity into an inner cavity, between the inner wall and the porous separating member, and an outer cavity, between the outer wall and the porous separating member, and to put the inner cavity in fluid communication with the outer cavity only in a front zone of the cavity in contact with the leading edge, and a two-phase fluid is contained in the cavity.

3 Claims, 4 Drawing Sheets

(51) Int. Cl.
 *B64D 33/02* (2006.01)
 *F02C 7/047* (2006.01)
 *B64D 29/00* (2006.01)
(52) U.S. Cl.
 CPC ...... *F02C 7/047* (2013.01); *B64D 2033/0233* (2013.01)

(56) References Cited

U.S. PATENT DOCUMENTS

| | | | |
|---|---|---|---|
| 4,738,416 A | | 4/1988 | Birbragher |
| 5,944,287 A | * | 8/1999 | Rodgers ................. F02O 7/047 |
| 2009/0152401 A1 | | 6/2009 | Sternberger |
| 2016/0332724 A1 | * | 11/2016 | Mehring ................ B64D 15/04 |

* cited by examiner

NACELLES FOR AIRCRAFT ENGINES WITH DE-ICING SYSTEMS USING A TWO-PHASE FLUID

CROSS-REFERENCE TO RELATED APPLICATION

This application claims priority to and benefit of Italian Patent Application No. 102015000018736 filed May 28, 2015, the contents of which are incorporated by reference in their entirety.

FIELD OF THE INVENTION

The present invention relates to nacelles for aircraft engines, in particular for a jet engine.

BACKGROUND OF THE INVENTION

The term "engine nacelle", or more simply "nacelle", is to be understood as referring to a tubular casing with an aerodynamic shape designed to contain an aircraft engine. The nacelle is typically fixed to the wing of the aircraft, but may also be fixed to the fuselage or to the vertical tail assembly of the aircraft. The nacelle extends along an axis parallel to the longitudinal axis (front-rear direction) of the aircraft. The nacelle is open both at its front end to allow entry of the air and at its rear end to allow exit of the exhaust gases. The nacelle typically comprises an inner wall and an outer wall which are connected to each other at the front end along a leading edge and at the rear end along a trailing edge. The inner wall and the outer wall, together with the leading edge and the trailing edge, enclose a cavity.

The formation of ice on the leading edge of the nacelle is considered to be particularly dangerous since fragments of ice may become detached from this edge and strike the blades of the compressor of the jet engine. Ice fragmentation systems, designed to facilitate separation of the ice from the leading edge of the nacelle, have therefore been developed and are currently used. They consist, for example, of compressed-air systems or heating systems using electric resistances. These known systems, however, are not particularly effective since they intervene only when the ice has already formed and therefore, by causing separation of the ice from the leading edge, they may even increase the risk that fragments of ice may strike the blades of the compressor. Moreover, known de-icing systems are not very efficient from the point of view of power consumption.

SUMMARY OF THE INVENTION

It is an object of the present invention to provide nacelles for aircraft engines which are not affected by the drawbacks of the prior art mentioned above. More particularly, the present invention aims at providing engine nacelles with de-icing systems that prevent the formation of ice on the leading edge of the nacelle, that do not draw power from the engine and that do not require an external power supply.

This object and other objects are fully achieved according to the present invention by virtue of nacelles for aircraft engines having the features described and claimed herein.

In short, the invention is based on the concept of introducing a two-phase fluid into the cavity defined between the inner wall and outer wall of the nacelle and inserting into the cavity a separating member of porous material formed so as to divide the cavity into an inner cavity and an outer cavity which extend between the inner wall of the nacelle and the porous separating member and between the outer wall of the nacelle and the porous separating member, respectively, and which are in fluid communication with each other only in the front zone of the cavity, i.e. in the zone which is in contact with the leading edge of the nacelle. Owing to the presence of the porous separating member and the two-phase fluid inside the cavity, during operation in the rear zone of the inner cavity the fluid receives heat from the exhaust gases emitted by the engine and therefore evaporates. The fluid in the vapour phase is moved by its pressure towards the front zone of the inner cavity (i.e. into the zone of the leading edge of the nacelle), where it releases most of the vaporization heat and condenses. The zone of the leading edge of the nacelle, which is the coldest zone of the nacelle, and therefore the zone where ice is most likely to form, is thus heated. The fluid that is again in the liquid phase in the outer cavity, moves therefore by capillary action through the porous separating member towards the inner cavity. In this way a continuous circulation of the fluid is created and, as a result of evaporation and condensation, ensures heat transfer from the rear zone of the inner cavity to the leading edge and therefore to the outer cavity. As can be readily understood, engine nacelles with de-icing systems according to the invention prevent the formation of ice on the leading edge of the nacelle without requiring any external power supply, without drawing power from the engine, without the need for moving mechanical parts and without increasing the overall sizes of the nacelle.

According to an embodiment, a plurality of divider elements are provided between the inner wall and the outer wall and are designed to divide the inner cavity and the outer cavity into a corresponding plurality of sectors not communicating directly with each other and to divide the separating member into a corresponding plurality of separating member sectors. In this way an improved distribution of the fluid, in particular in the circumferential direction, along with a correspondingly improved distribution of the temperature, is obtained.

Further characteristic features and advantages of the present invention will be apparent from the following detailed description with reference to the figures briefly described below.

DETAILED DESCRIPTION

Figure 1:
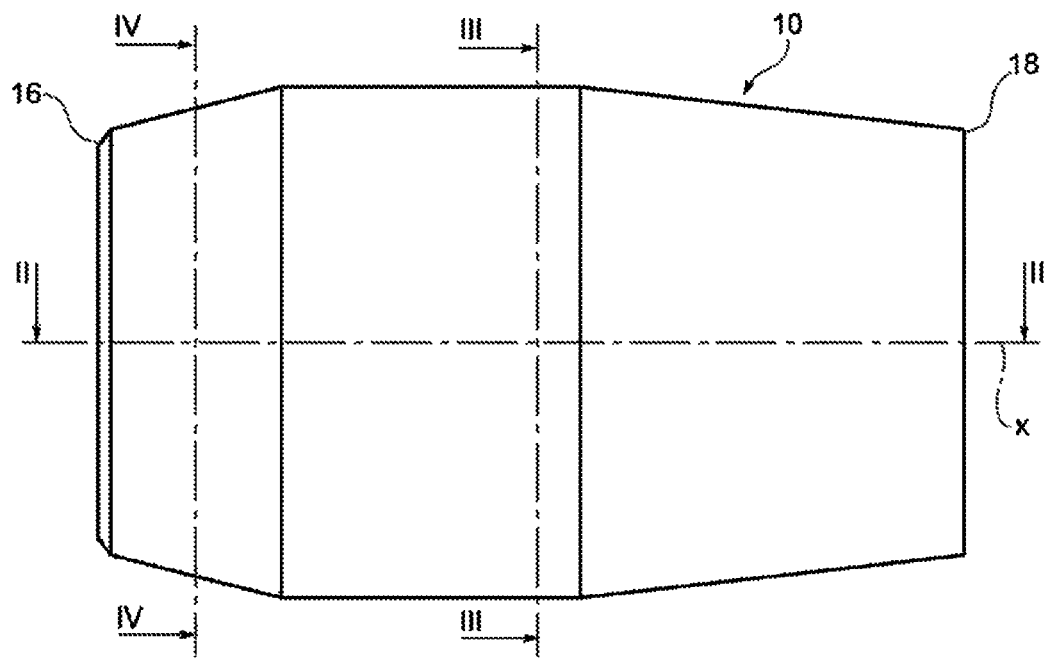
FIG. 1 is a side view of an engine nacelle according to an embodiment of the present invention.
Figure 2:
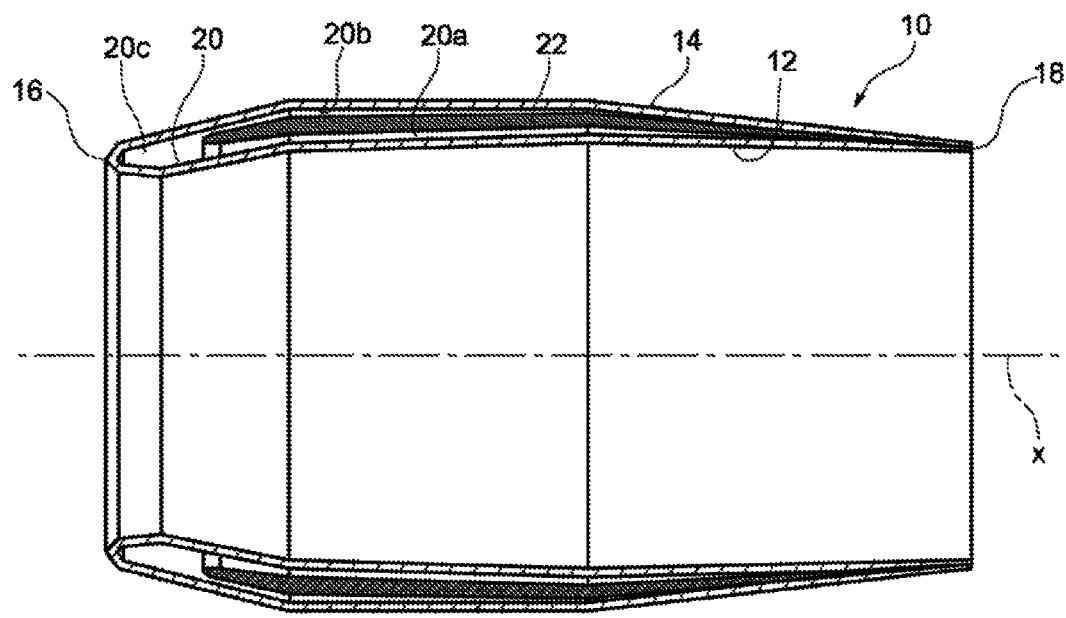
FIGS. 2, 3 and 4 are an axial section view along an axial section plane indicated II-II in FIG. 1, a cross section view along a cross section plane indicated in FIG. 1, and a further cross section view along a further cross section plane indicated IV-IV in FIG. 1, respectively, of the engine nacelle of FIG. 1.
Figure 3:
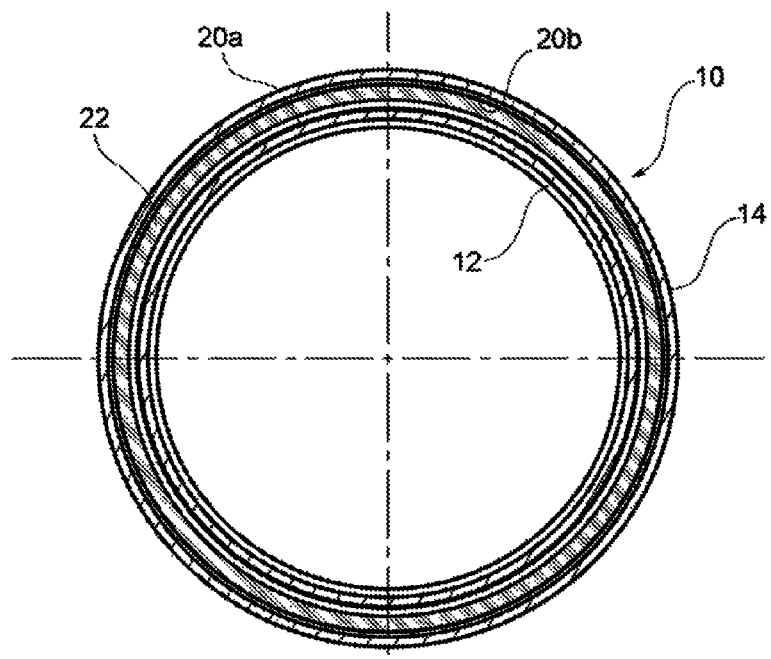
Figure 4:
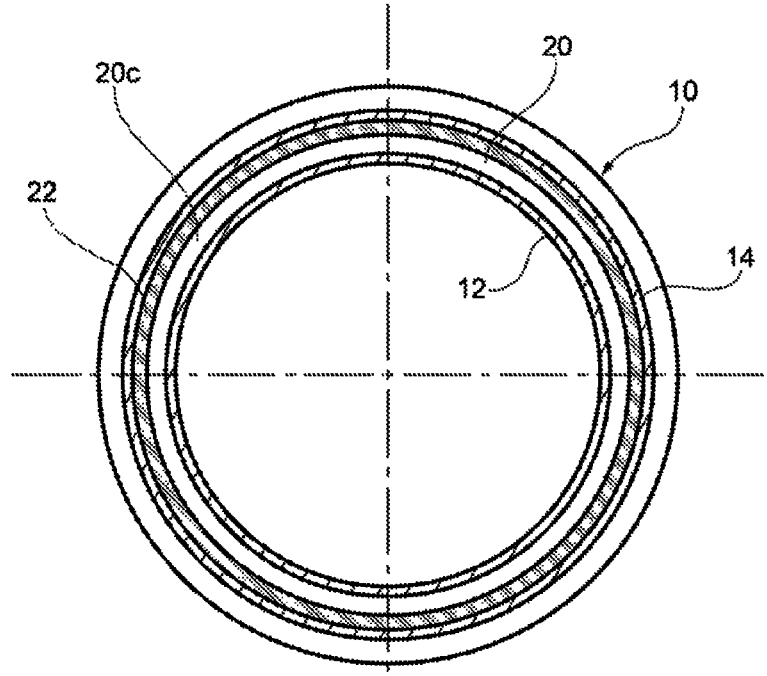

With reference first to FIGS. 1 to 4, an engine nacelle for an aircraft engine (hereinafter referred to simply as "nacelle") according to an embodiment of the present invention is generally indicated 10. The nacelle 10 is intended to contain an aircraft engine (not shown, but of per-se-known type), in particular a jet engine. In a per-se-known manner, the nacelle 10 is formed as a tubular casing with an aerodynamic shape which extends along an axis x parallel to the longitudinal axis (front-rear direction) of the aircraft and is substantially symmetrical with respect to this axis. The nacelle 10 is open both at its front end to allow entry of air into the engine and at its rear end to allow exit of the exhaust gases emitted by the engine. The nacelle 10 comprises an inner wall 12 and an outer wall 14 which are connected to each other at the front end along a leading edge 16 and at the rear end along a trailing edge 18. As shown in the axial section view of FIG. 2, the leading edge 16 has a rounded form, while the trailing edge 18 has the form of a sharp edge. The inner wall 12 and the outer wall 14, together with the leading edge 16 and the trailing edge 18, enclose a cavity 20.

In order to prevent the formation of ice on the outer surface of the nacelle 10, in particular at the leading edge 16, in certain embodiments the nacelle 10 is provided with a de-icing system comprising a tubular separating member 22 of porous material placed inside the cavity 20 and configured to divide the cavity 20 into an inner cavity 20a and an outer cavity 20b. More specifically, the inner cavity 20a extends between the inner wall 12 and the porous separating member 22, while the outer cavity 20b extends between the outer wall 14 and the porous separating member 22. The inner cavity 20a and the outer cavity 20b are in fluid communication with each other only in a front zone, indicated as 20c, of the cavity 20, i.e. along the leading edge 16. The cavity 20 contains a two-phase fluid, which may be, for example, water, ammonia or propylene. During operation, in the rear zone of the inner cavity 20a the fluid receives heat from the exhaust gases emitted by the engine and therefore evaporates. The fluid in vapour phase is moved by its pressure towards the front zone of the cavity, i.e. towards the zone 20c in the vicinity of the leading edge 16, where it releases most of the vaporization heat and condenses. The leading edge 16 is thus heated owing to the heat released by the condensing fluid. The fluid in liquid phase therefore moves from the zone 20c of the cavity 20 towards the outer cavity 20b and from here by capillary action through the porous separating member 22 towards the inner cavity 20a. In this way a continuous circulation of the fluid is created and, as a result of the evaporation and condensation phases, ensures heat transfer from the rear zone of the inner cavity 20a to the zone 20c of the cavity 20 (which zone is in contact with the leading edge 16) and therefore to the outer cavity 20b.

Figure 5:
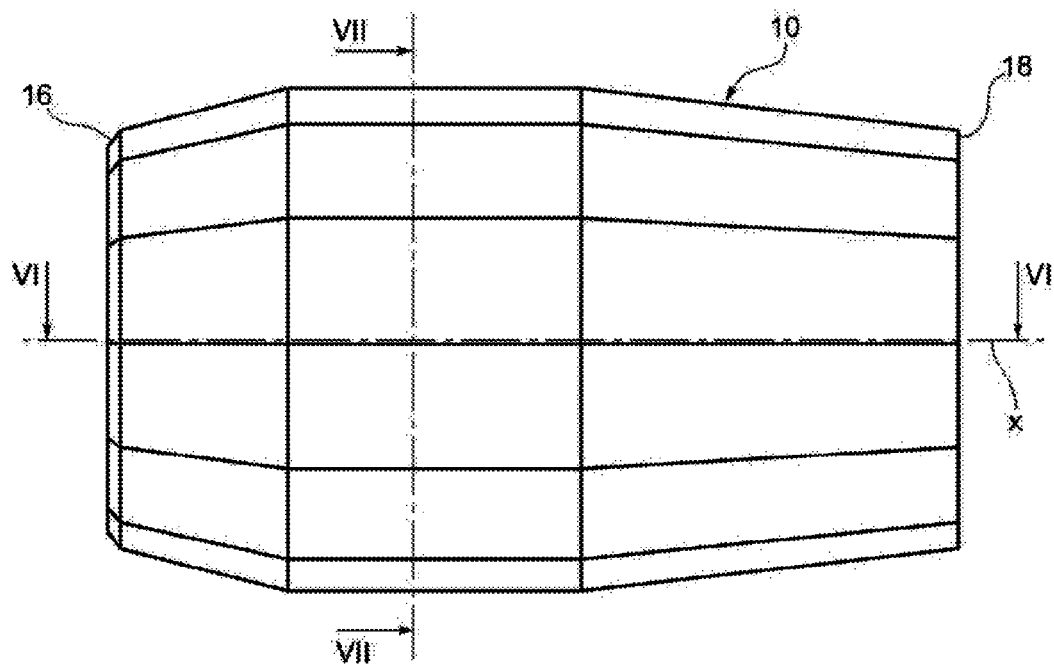
FIG. 5 is a side view of an engine nacelle according to a further embodiment of the present invention.
Figure 6:
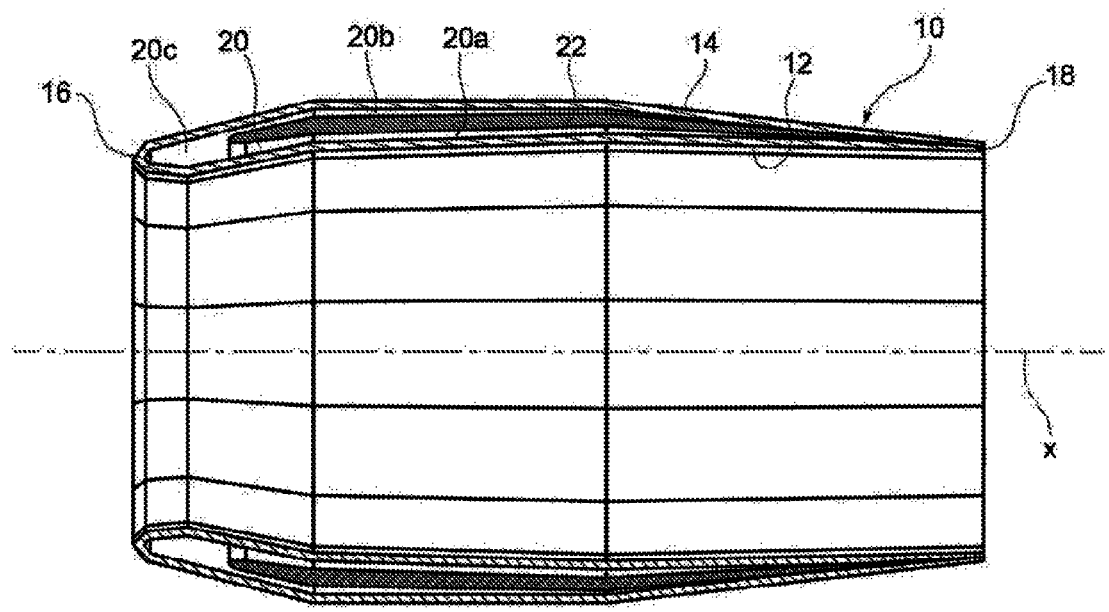
FIGS. 6 and 7 are an axial section view along an axial section plane indicated VI-VI in FIG. 5 and a cross section view along a cross section plane indicated VII-VII in FIG. 5, respectively, of the engine nacelle of FIG. 5.
Figure 7:
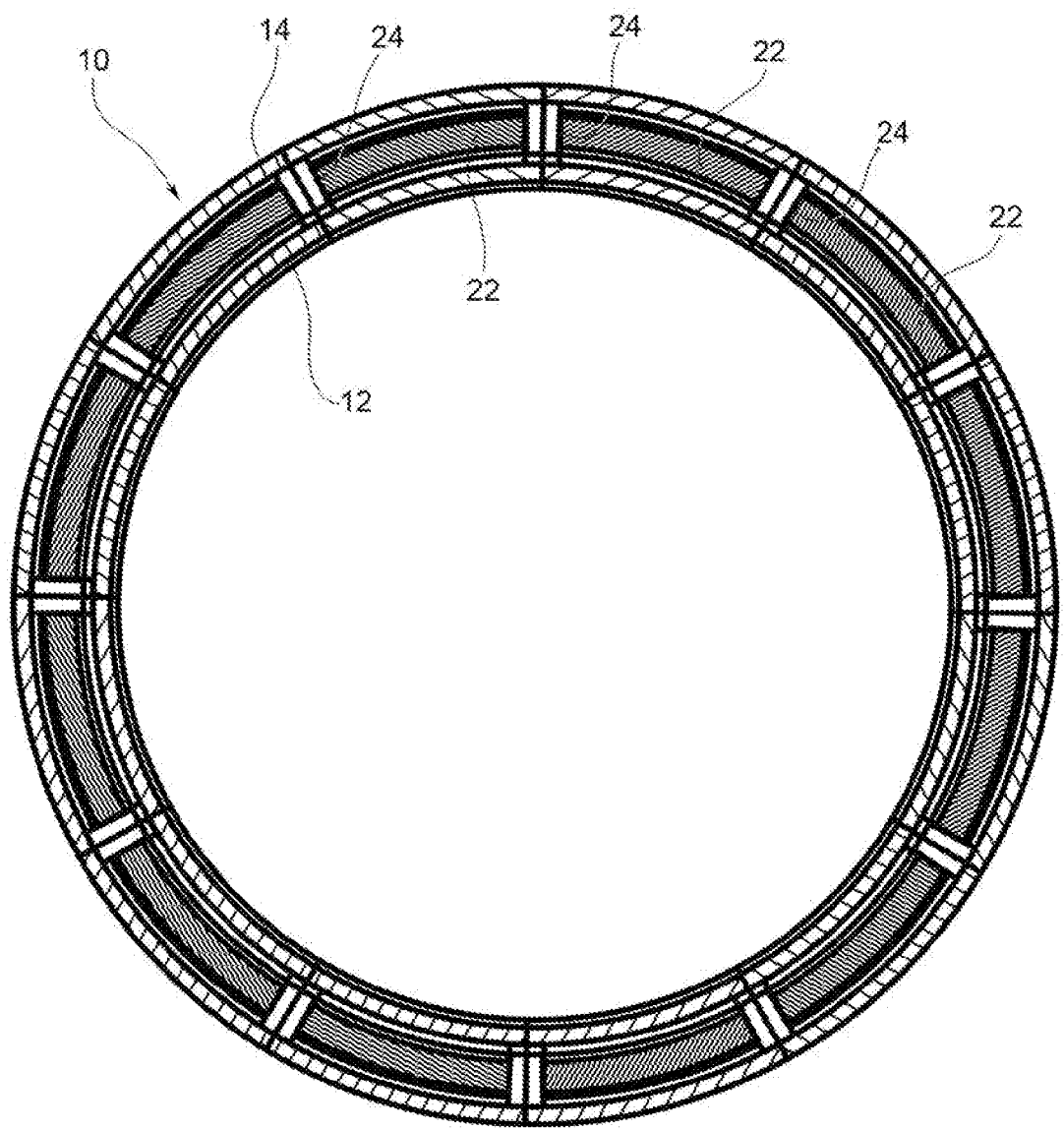

With reference now to FIGS. 5 to 7, where parts and elements identical or corresponding to those of FIGS. 1 to 4 have been assigned the same reference numbers, a further embodiment of the present invention will be described. This further embodiment of the present invention differs from that of FIGS. 1 to 4 in that the inner cavity 20a and the outer cavity 20b do not extend continuously, in the circumferential direction, but are each divided into a plurality of axial sectors (which in the example proposed are 12 in number, but in other embodiments may be more or less than 12) by a corresponding plurality of separating elements 24 which extend radially between the inner wall 12 and the outer wall 14 and axially over the entire axial extension of the separating member 22 or at least over most of the axial extension of the separating member 22. The separating member 22 also does not extend continuously, in the circumferential direction, as in the embodiment of FIGS. 1 to 4, but is divided by the separating elements 24 into a corresponding plurality of separating member sectors, each of which separates a sector of the inner cavity 20a from a corresponding sector of the outer cavity 20b. According to this embodiment, therefore, there is no direct fluid communication between one cavity sector (be it inner or outer) and the adjacent cavity sectors.

Compared to the embodiments of FIGS. 1 to 4, further embodiments avoid the risk of a non-uniform distribution of the fluid inside the cavity and therefore a non-uniform distribution of the temperature (in fact, in the case of a cavity which extends continuously in the circumferential direction the fluid tends to accumulate by gravity in the bottom part of the cavity). Moreover, in the event of damage to a wall of the nacelle, be it the inner wall or outer wall, resulting in the loss of fluid, with this further embodiment only one cavity sector, or in any case only a limited number of cavity sectors, is/are emptied, without therefore adversely affecting the overall operation of the de-icing system. A further advantage, compared to preceding embodiments, consists in easier construction, since the parts to be assembled (in particular the separating member sectors) have smaller dimensions.

In view of the above description, it is clear that engine nacelles with a de-icing system according to the invention are able to prevent the formation of ice on the leading edge of the nacelle, without requiring any external power supply, without drawing power from the engine, without the need for moving mechanical parts and without increasing the overall sizes of the nacelle. Moreover, the de-icing system is extremely reliable, since the circulation of the fluid inside the cavity and the heat exchange between fluid and the walls of the nacelle can occur without the need for operating members and therefore without the risks associated with possible breakage or malfunctioning of said operating members.

Naturally, the principle of the invention remaining unchanged, the embodiments and the constructional details may be greatly varied with respect to those described and still fall within the scope of the claims.

What is claimed is:

1. An engine nacelle for an aircraft engine, comprising a tubular casing open at its opposite front and rear ends, with an inner wall and an outer wall which are connected to each other at the front end along a leading edge and at the rear end along a trailing edge and which enclose, along with the leading edge and the trailing edge, a cavity where a two-phase fluid is contained,
    wherein the nacelle is also provided with a de-icing system arranged to heat the walls of the nacelle at least in the zone of the leading edge to avoid the formation of ice, and
    wherein said de-icing system comprises a separating member of porous material arranged inside the cavity so as to divide the cavity into an inner cavity, between the inner wall and the separating member, and an outer cavity, between the outer wall and the separating member, and so as to put the inner cavity in open communication with the outer cavity only in a front zone of the cavity in contact with the leading edge, and
    wherein the separating member is configured to allow the fluid to pass through the porous material between the inner and outer cavities only in a liquid phase.

2. The engine nacelle of claim 1, wherein the inner cavity and the outer cavity, as well as the separating member, extend continuously in a circumferential direction.

3. The engine nacelle of claim 1, further comprising a plurality of separating elements arranged between the inner wall and the outer wall so as to divide the inner cavity and the outer cavity into a corresponding plurality of sectors not directly communicating with each other and so as to divide the separating member into a corresponding plurality of separating member sectors.

* * * * *